E. P. McCOLLOM.
VALVE OR FAUCET.
APPLICATION FILED AUG. 14, 1908.
953,637.
Patented Mar. 29, 1910.
2 SHEETS—SHEET 1.
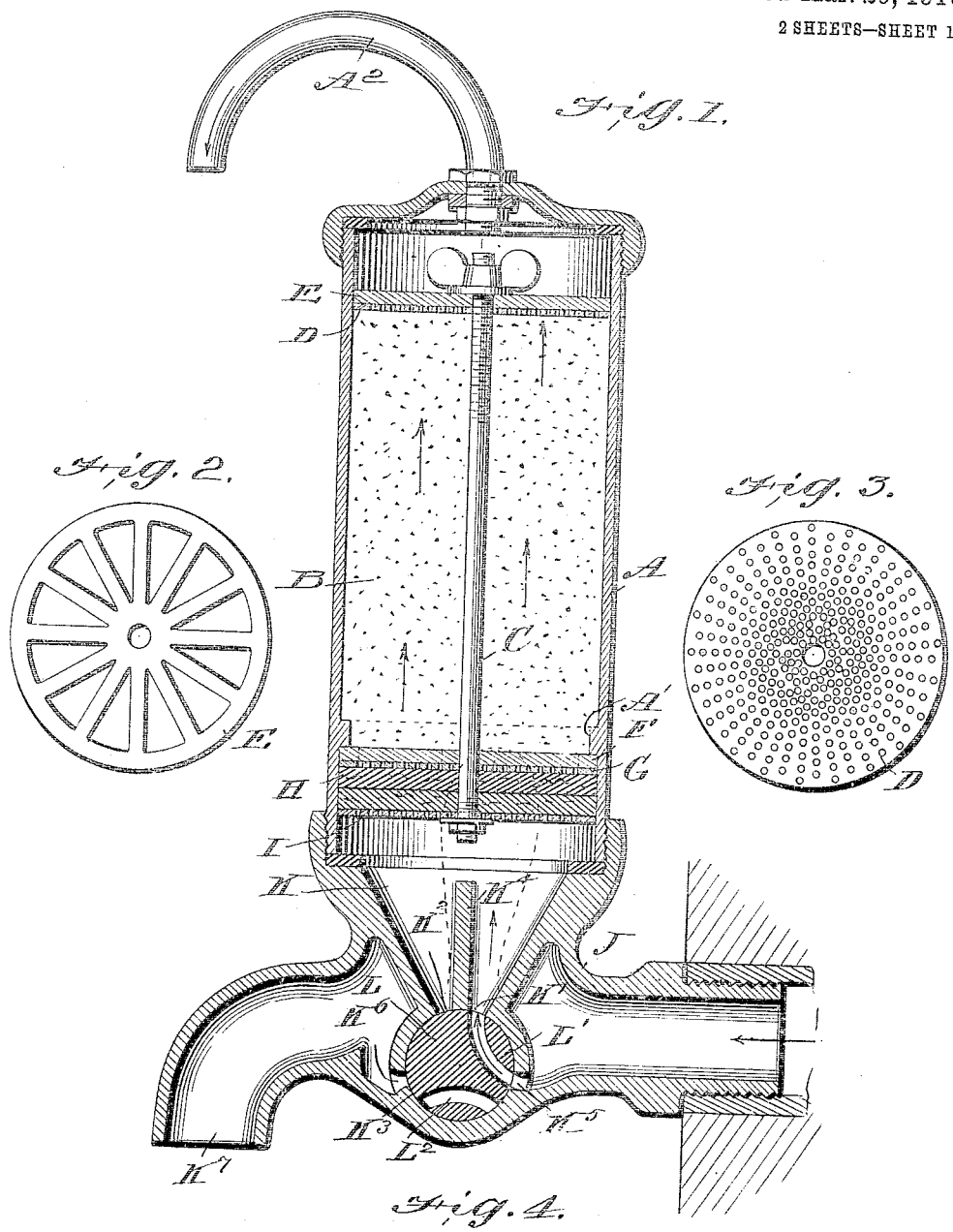
WITNESSES
F. C. Barry
Perry B. Turpin
INVENTOR
EDWIN P. McCOLLOM
BY Munn & Co.
ATTORNEYS

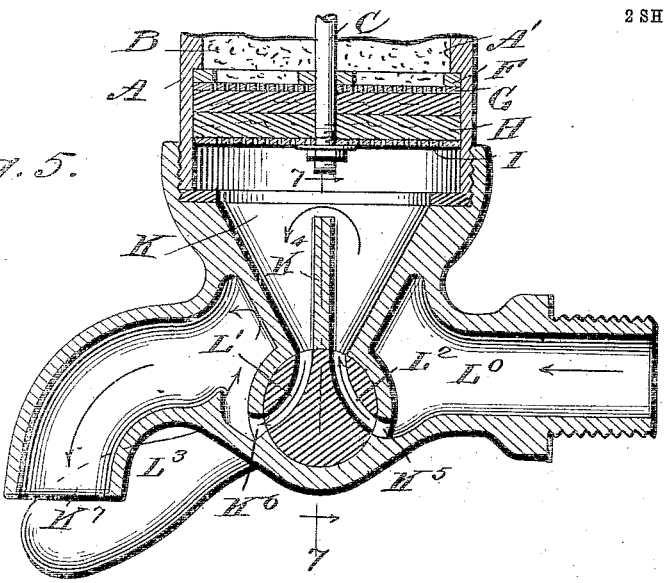
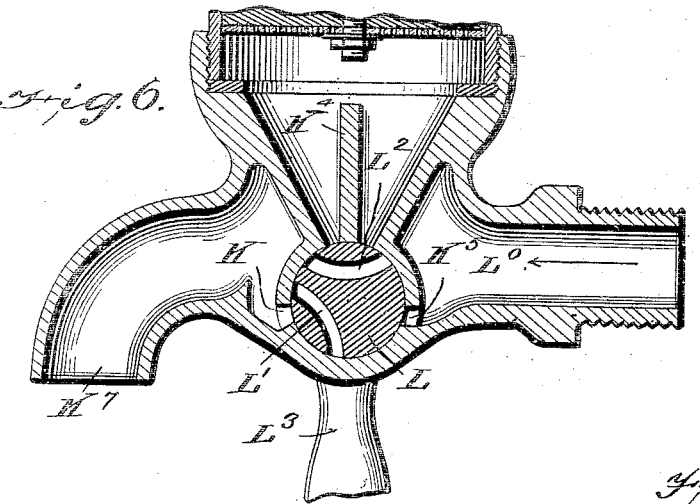
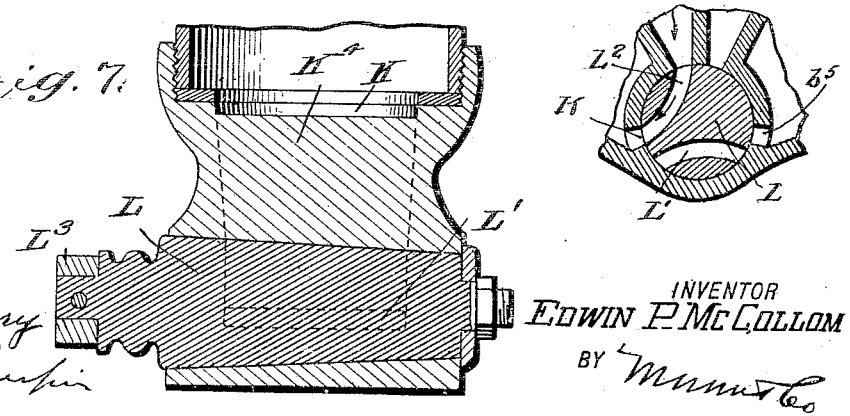

UNITED STATES PATENT OFFICE.

EDWIN PALMER McCOLLOM, OF BALTIMORE, MARYLAND.

VALVE OR FAUCET.

953,637.  Specification of Letters Patent.  Patented Mar. 29, 1910.

Application filed August 14, 1908. Serial No. 448,460.

*To all whom it may concern:*

Be it known that I, EDWIN PALMER MC-COLLOM, a citizen of the United States, and a resident of the city of Baltimore and State of Maryland, have invented certain new and useful Improvements in Valves or Faucets, of which the following is a specification.

This invention is an improvement in faucets and consists in certain novel constructions and combinations of parts as will be hereinafter described and claimed.

In the drawings, Figure 1 is a vertical longitudinal section of a filter embodying my invention. Figs. 2, 3 and 4 are detail views of different plates employed in the filter. Fig. 5 is a detail sectional view of the lower portion of the filter showing the faucet plug in a different position from that shown in Fig. 1. Fig. 6 is a similar view showing the faucet plug in still a different position, and Fig. 7 is a sectional view on about line 7—7 of Fig. 5, and Fig. 8 is a sectional view showing the faucet in position to drain the filter.

In carrying out my invention I employ a filter chamber A, having a cylinder in which charcoal or other filtering material B is held between the upper and lower diaphragms bound together by a central tie rod C. The upper diaphragm is shown as comprising a perforated plate D, illustrated in detail in Fig. 3, and a perforated or spoked plate E as illustrated in detail in Fig. 2, the lower diaphragm comprising a spoked or perforated plate F similar to the plate shown in Fig. 2, and abutting an annular flange A' within the circle, a perforated plate G below the plate F and constructed as shown in detail in Fig. 3, a felt or other cloth plate or plates H below the perforated plate G, and a perforated plate I similar in construction to the plate shown in Fig. 3, and underlying the cloth plates or layers as best shown in Figs. 1 and 5 of the drawings.

The faucet J connects with the lower end of the filter body A by means of what for convenience of reference I term the chamber K, whose upper end connects with the lower end of the barrel A, and whose lower end communicates through an inlet port $K'$ and an outlet port $K^2$, with the seat $K^3$ of the plug of the faucet. A partition $K^4$ extends upwardly between the inlet and outlet ports of the chamber K and operates at its lower end to separate the said ports and terminates at its upper end below the lower diaphragm of the filtering chamber affording a free passage above the upper end of the partition $K^4$ to establish at said point a communication between the ports $K'$ and $K^2$, the said partition $K^4$ lying centrally of the filtering barrel and crossing the center thereof thus occupying a diametrical position with relation to the said barrel as shown in Figs. 1, 5 and 6 of the drawings. This termination of the upper end of the partition below the lower diaphragm of the filtering chamber is important as it permits the scouring and cleansing of the said lower diaphragm by the force of the water when the faucet plug is turned to the position shown in Fig. 5, thus aiding in cleansing the filter as is desired.

The cylinder seat $K^3$ for the faucet plug L is provided in addition to the ports $K'$ and $K^2$ with a supply port $K^5$, and a discharge port $K^6$, the latter leading to the nozzle $K^7$, as shown in Figs. 1, 5 and 6.

The plug L is provided with the passages $L'$ and $L^2$, and these passages are arranged as shown, so they may establish communication between the supply port $K^5$ through the ports $K'$ and $K^2$ to the discharge port $K^6$, as shown in Fig. 5, when it is desired to discharge unfiltered water through the nozzle $K^7$; or if desired the plug may be turned as shown in Fig. 6 to shut off the supply of water either to the filter or to the nozzle $K^7$, or the plug may be turned as shown in Fig. 1 to discharge water in the barrel of the filter and to shut off the discharge port $K^6$ to the nozzle $K^7$. As shown in Fig. 1, this faucet is arranged for the filtering operation, the water passing upwardly through the filtering material and discharging from a spout $A^2$. When desired, however, the faucet may be quickly closed to the position shown in Fig. 6, or the plug may be adjusted to the position shown in Fig. 5. In this position the water will be turned upwardly from the port $K'$ into the chamber K and against the lower or bottom diaphragm of the filter and will rebound and pass with broken force through the ports $K^2$ and $K^6$ out of the nozzle of the faucet. The plug has a suitable handle $L^3$, by which it may be manipulated to its different positions. This central partition $K^4$ forms no substantial obstruction to the discharge of unfiltered water when the parts are as shown in Fig. 5, and by forcing the running water in contact with the bottom of the filter apparatus operates to wash and cleanse the same by the action of the running water.

In Fig. 8 I show the faucet adjusted to establish communication by the passage L² between the outlet port K² and the discharge port K⁶. In this position the supply port K⁵ will be closed and the water may be drained from the filter. This is useful, as in operation it facilitates the cleaning of the filter by carrying off the dirt and other substances secreted in the filter material at the bottom of the filtering chamber, this being important as the filter may be drained dry at any time, which is especially desirable when the filter is to be thrown out of operation temporarily as when the user leaves for a short vacation.

It will be noticed especially from Fig. 1 that the passages L′ and L² open at one end a distance apart equal to the distance between the inlet and outlet ports K′ and K² and flare thence toward their other ends and open at said ends a distance apart equal to the distance between the supply port K′ and the discharge port K⁶ of the plug seat so that the plug may be adjusted to establish communication between the said ports as shown in Fig. 5, to secure a discharge of unfiltered water for laundry or other purposes, and the plug may be adjusted as shown in Fig. 1 to direct the supply of water through the filtered material.

I claim:

1. The combination of a faucet having a seat for its plug, an intermediate chamber above the said seat and adapted for connection with the lower end of the filter barrel, and inlet and outlet ports between said plug seat and the intermediate chamber, a partition extending upwardly within the intermediate chamber and arranged at its lower end between said inlet and outlet ports and terminating at its upper end sufficiently low to permit communication being established over said upper end between the inlet and outlet ports, the said plug seat having a supply port, and a discharge port leading to the nozzle of the faucet, and a plug in said seat and having passages adapted to establish communication between the supply port and the port leading to the intermediate chamber, or between said ports and the outlet of the nozzle, all substantially as and for the purposes set forth.

2. The combination of a valve casing adapted for connection with a filter and having an inlet port and an outlet port, and also provided with a supply port and a discharge port and a valve in said casing and having means controlling the passage of water to the filter, and also having a passage which may be adjusted to communicate with the outlet and discharge ports for draining the filter, and simultaneously shutting off the supply of water to the filter, substantially as set forth.

3. A faucet for use in connection with filters connected therewith, and having an intermediate chamber, a plug seat below the same and having inlet and outlet ports communicating with said chamber, and a partition between the said ports, the plug seat being also provided with supply and discharge ports opposite each other and equidistant respectively from the inlet and outlet ports of the intermediate chamber, a plug having passages formed through it and arranged at one end a distance apart equal to the distance apart of the inlet and outlet ports of the intermediate chamber, the passages flaring from said ends and opening at their other ends a distance apart equal to the distance between the supply and discharge ports whereby the plug may be adjusted to establish communication between the supply and inlet ports, and the outlet and discharge ports, substantially as set forth.

4. The combination of a valve casing having supply and discharge ports, and also provided between the same with inlet and outlet ports leading to a communicating chamber, and a valve plug operating in said casing and having two passages in approximately the same plane, said passages opening at one end a distance apart equal to the distance between the inlet and discharge ports, and opening at their other ends a distance apart equal to the distance between the supply and discharge ports and the ends of one of said passages being located a distance apart corresponding to the distance between the supply and inlet ports, all substantially as and for the purposes set forth.

EDWIN PALMER McCOLLOM.

Witnesses:
WM. H. H. RALEIGH,
THOMAS G. JONES.